United States Patent
Peronnet-Paquin et al.

(10) Patent No.: US 7,198,744 B2
(45) Date of Patent: Apr. 3, 2007

(54) PREPARATION OF CO-EXTRUDED MULTI-LAYERED RUBBER COMPOSITE AND USE AS COMPONENT OF A TIRE

(75) Inventors: Anne Therese Peronnet-Paquin, Luxembourg (LU); Michel Jacques Meunier, Gouvy (BE); Jacques Camille Nevouet, Steinsel (LU); Jean Luc Dheur, Arlon (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 219 days.

(21) Appl. No.: 10/461,211

(22) Filed: Jun. 13, 2003

(65) Prior Publication Data

US 2004/0028899 A1  Feb. 12, 2004

Related U.S. Application Data

(60) Provisional application No. 60/401,567, filed on Aug. 6, 2002.

(51) Int. Cl.
B29C 47/06 (2006.01)

(52) U.S. Cl. .......................... 264/173.11; 264/174.11; 425/380; 425/462

(58) Field of Classification Search .................. None
See application file for complete search history.

(56) References Cited

U.S. PATENT DOCUMENTS

| | | | | |
|---|---|---|---|---|
| 2,803,041 A | * | 8/1957 | Hill et al. ................ | 264/75 |
| 3,051,453 A | | 8/1962 | Sluijters ................. | 259/4 |
| 3,320,636 A | * | 5/1967 | Corbett ................... | 425/133.5 |
| 3,321,804 A | * | 5/1967 | Breidt, Jr. et al. ....... | 425/133.5 |
| 3,405,425 A | * | 10/1968 | Buckley et al. .......... | 425/133.5 |
| 3,444,031 A | * | 5/1969 | Schrenk ................... | 428/114 |
| 3,485,912 A | * | 12/1969 | Chisholm et al. ......... | 264/172.15 |
| 3,511,903 A | * | 5/1970 | Glass et al. ............. | 264/173.13 |

(Continued)

FOREIGN PATENT DOCUMENTS

EP  0145918  6/2001

(Continued)

OTHER PUBLICATIONS

Patent Abstract of Japan, vol. 10, No. 51, for Publication No. 60199627, published Oct. 9, 1985.

(Continued)

*Primary Examiner*—Mark Eashoo
(74) *Attorney, Agent, or Firm*—Henry C. Young, Jr.

(57) ABSTRACT

This invention relates to the preparation of a multi-layered rubber composite, said composite and a tire having a component prepared thereby. The multi-layered rubber composite is composed of at least two individual rubber compositions configured as at least three parallel aligned alternating rubber layers, wherein each rubber layer extends through the rubber composite thickness from one side to the other opposing side. The multi-layered rubber composite is prepared by co-extruding at least two individual rubber compositions, via an individual extruder for each rubber composition, to an internal cavity of a former. Said former is comprised of an internal cavity which contains a sequence of flow deflectors and channels for guiding the at least two individual rubber compositions to form said multi-layered rubber composite in a single manufacturing step.

13 Claims, 4 Drawing Sheets

U.S. PATENT DOCUMENTS

| | | | |
|---|---|---|---|
| 3,557,265 A * | 1/1971 | Chisholm et al. | 264/46.1 |
| 3,687,589 A * | 8/1972 | Schrenk | 425/131.1 |
| 3,759,647 A * | 9/1973 | Schrenk et al. | 425/133.5 |
| 3,778,207 A * | 12/1973 | Luraschi | 425/133.5 |
| 4,917,851 A | 4/1990 | Yamada et al. | 264/40.7 |
| 5,017,118 A | 5/1991 | Looman et al. | 425/133.5 |
| 5,030,079 A | 7/1991 | Benzing, II | 425/140 |
| 5,147,198 A | 9/1992 | Capelle | 425/205 |
| 5,171,394 A | 12/1992 | Laurent | 156/397 |
| 5,223,276 A * | 6/1993 | Djordjevic et al. | 425/131.1 |
| 5,259,746 A | 11/1993 | Minuado | 425/14 |
| 5,269,995 A * | 12/1993 | Ramanathan et al. | 264/173.12 |
| 5,316,703 A * | 5/1994 | Schrenk | 264/1.34 |
| 5,389,324 A * | 2/1995 | Lewis et al. | 264/173.12 |
| 5,453,238 A | 9/1995 | Bardy | 264/174.11 |
| 5,843,349 A | 12/1998 | Anders et al. | 264/40.5 |
| 6,037,397 A | 3/2000 | Satoh et al. | 524/404 |
| 6,172,155 B1 | 1/2001 | Jana | 524/495 |
| 6,423,140 B1 * | 7/2002 | Liu et al. | 118/411 |

FOREIGN PATENT DOCUMENTS

| | | |
|---|---|---|
| GB | 1166169 | 10/1969 |
| GB | 1222895 | 2/1971 |

OTHER PUBLICATIONS

European Search Report.

* cited by examiner

PREPARATION OF CO-EXTRUDED MULTI-LAYERED RUBBER COMPOSITE AND USE AS COMPONENT OF A TIRE

The Applicants hereby incorporate by reference prior U.S. Provisional Application Ser. No. 60/401,567, filed on Aug. 6, 2002.

FIELD OF THE INVENTION

This invention relates to the preparation of a multi-layered rubber composite, said composite, and a tire having a component prepared thereby. The multi-layered rubber composite is composed of at least two individual rubber compositions configured as at least three parallel aligned alternating rubber layers, wherein each rubber layer extends through the rubber composite thickness from one side to the other opposing side. The multi-layered rubber composite is prepared by co-extruding at least two individual rubber compositions, via an individual extruder for each rubber composition, to an internal cavity of a former. Said former is comprised of an internal cavity which contains a sequence of flow deflectors and channels for guiding the at least two individual rubber compositions to form said multi-layered rubber composite in a single manufacturing step.

BACKGROUND OF THE INVENTION

Historically, various components for tires, such as for example tire treads, have been suggested as composites of a plurality of profiled strips prepared by various extrusion processes.

Co-extruded, multi-component rubber extrudates may conventionally be prepared by co-extruding at least two different rubber compositions by using an individual extruder for each rubber composition which individually cause an extruded rubber composition to flow through a suitable die member to, in turn cause the individual rubber compositions to controllably flow and join within the die member and exit therefrom in a profiled multi-component rubber extrudate. Such co-extrusion process to prepare a multi-component rubber extrudate for a tire, such as for example a tire tread, is well known to those having skill in such art. For example, see U.S. Pat. Nos. 5,453,238, 6,172,155, 5,843,349, 5,017,118, 5,259,746, 5,171,394, 5,147,198, and 5,030,079.

In the context of the present invention, the term "multi-layered" refers to an extruded multi-component composite, or extrudate, which features alternating layers of at least two rubber compositions which extend across the thickness of the extrudate. It is considered herein that suitable convenient methods for the manufacturing of such multi-layered tire components remain to be desired in many respects. It is believed that available techniques are usually tedious and time consuming. Historically, it is believed that a rather basic procedure involves a manual assembly of different extrudate layers, but this method is limited to simple multi-layered structures (e.g. a very low number of layers and a simple extrudate shape) and the quality of hand layered-up components may become questionable, for example, if air should become entrapped between adjacent slices. One solution for the manufacturing of multi-layered rubber component is seen from the static mixer technology (U.S. Pat. No. 3,051,453) which involves a co-extrusion of different rubber compositions to cause the rubber compositions to flow through a series of specific layering inserts. In particular, it is seen that the multiplication of rubber layers is obtained by successive bi-partitions of the rubber stream within the layering inserts. Apparently within each layering insert the incoming flow is divided into two through a "split" and "stack" process to double the number of incoming layers.

However, it is considered herein that such technology is inherently focused upon manufacturing of micro-layered components, namely very large numbers of layers of very thin, rubber compositions. The complexity of such layering equipment is considered herein to be excessive for a normal use in a high volume factory environment.

Accordingly, it is desirable to prepare a multi-layered unvulcanized rubber component in an improved manner, namely by use of a single manufacturing step, where a plurality of individual layers of different rubber compositions are created and directly combined within a single pre-former during the extrusion process.

In particular, it is desired to provide a relatively simple co-extrusion method and apparatus suitable for implementation in a factory environment and for mass production of multi-layered tire components.

In particular, it is desired to provide such process with a good control of the shape and dimensions of such rubber layers.

DISCLOSURE AND PRACTICE OF THE INVENTION

In accordance with this invention, a process is provided of preparing a multi-layered rubber composite, or extrudate, composed of a first rubber composition and at least one additional rubber composition (from one to about three, and preferably one additional rubber composition) configured as alternating, parallel aligned, layers of said rubber compositions, wherein said first rubber composition layer alternates with at least one of said additional rubber composition layers, wherein each rubber layer extends through said rubber composite from one side to the opposite side of said rubber composite, by:

(A) Simultaneously extruding said first rubber composition and said at least one additional rubber composition through an individual extruder for each of said rubber compositions to form a main stream of said first rubber composition and a secondary stream of each additional rubber composition;

(B) Simultaneously introducing said main stream and said secondary stream(s) to a former, where said former is comprised of:

(1) a base portion, a top portion and an internal cavity therebetween (where said top portion is positioned opposite said base portion); and (2) a plurality of "N" spaced apart individual flow deflectors (where "N" is the number of said flow deflectors) positioned within said internal cavity;

wherein said flow deflectors individually extend from said base portion to said top portion within said internal cavity (thereby connecting with said base portion and said top portion);

wherein said flow deflectors each contain an internal channel, said channel having an entrance portion which communicates with said base portion and having an exit portion, exclusive of said entrance portion, wherein said main stream is introduced into said internal cavity of said former and wherein said secondary stream(s) are introduced through said base portion of said former into said entrance portions of said internal channels within said flow deflectors to simultaneously:

(a) cause said main stream to flow around at least a portion of each individual flow deflector, exclusive of said exit portion of said internal channels, and to thereby separate into a plurality of N+1 individual spaced apart main streams, and (b) cause said secondary streams to flow within said individual internal channels of said flow deflectors to exit from each of said internal channels through said exit portion thereof and to thereby form a plurality of N individual secondary streams;

wherein said exit portions of said internal channels are positioned on said flow deflectors to cause said plurality of said individual secondary streams to exit said flow deflectors and, upon exiting therefrom, to flow in the direction of and between said individual main streams and to adhere to said individual main streams to form a stream of a rubber composite of alternating layers of said first rubber composition and said additional rubber composition(s); and (C) Simultaneously shaping said rubber composite stream through a die opening contained in a die member affixed to said former to form a shaped rubber composite (extrudate).

In practice, said base portion of said former contains "N" individual flow director channels positioned therein, wherein each individual flow director channel is aligned with and communicates with a corresponding individual entrance portion of an internal channel of a flow deflector of said former to separate said secondary stream(s) from their individual extruder(s) into a plurality of "N" individual secondary streams and introduce said plurality of individual secondary streams into said corresponding "N" internal channels within said deflectors through said base portion of said former.

In one aspect of the invention, said internal flow deflectors are aligned in a single row substantially parallel to each other wherein said row is positioned substantially 90° to said flow of said main stream.

In a further aspect of the invention, said internal flow deflectors are aligned in at least two separate rows thereof. For example a first and at least one additional row (e.g. a second row) of flow deflectors may be provided with one row positioned in front of said additional row(s), wherein each row is comprised of at least two flow deflectors positioned substantially parallel to each other within its individual row, wherein each row is positioned substantially 90° to said flow of said main stream and wherein the flow deflectors of said first row are individually off-set from individual deflectors of said additional row(s), (e.g. second row), in a manner that said individual flow deflectors are directly in the path of and thereby directly receive said flow of said main stream.

Exemplary implementation of the invention is described herein for a configuration involving only two extruders, individually providing a main stream of a rubber composition from one extruder and a secondary stream of another rubber composition from another extruder. Furthermore, the tubers (or extruders) delivering the individual streams of the two rubber compositions to be layered (rubber composition A as the first rubber composition (the main stream) and B as the additional, or second, rubber composition) are oriented at about 90° to each other. More particularly, rubber composition A flows along the main extrusion direction and around the flow deflectors within the former, and rubber composition B undergoes a 90° turn within the flow deflectors prior to merging between the plurality of streams of rubber composition A. It is of course understood that the present invention is not limited to the specific extruder configuration described above. The principle of the invention may be customized to other extruder layouts, like, for instance, duplex extruders operating in a "nose-to-nose" or a "piggy back" configuration, or triplex machines. By the term "nose-to-nose" it is meant a configuration where the extruders delivering each rubber composition are facing each other. By the term "piggy back" it is meant a configuration where the extruders delivering each rubber composition are located on top of each other. By the term "triplex machines" it is meant a configuration of three extruders by which three streams of rubber compositions may be introduced to the former, if desired.

In one aspect, said process comprises:

(A) simultaneously extruding two individual rubber compositions, namely a first rubber composition A and an additional rubber composition B, to form individual streams of each rubber composition, namely a main stream for said first rubber composition A and a secondary stream for said additional rubber composition B, via an individual extruder for each rubber composition, to an internal cavity of a former;

(B) simultaneously introducing said main stream of said first rubber composition A from its extruder into said internal cavity of said former to flow within said cavity around the plurality of N number of flow deflectors, wherein said flow deflectors are spaced apart from each other by substantially equal distances, wherein said flow deflectors are positioned parallel to each other within said cavity of said former to cause said main stream of rubber composition A to divide into N+1 individual streaming layers of said rubber composition A within the cavity of said former;

(C) simultaneously introducing said secondary stream of said additional rubber composition B into said internal channels contained within said flow deflectors through a plurality of N number of flow director channels extending through the base of said internal former, to create N individual secondary streams of rubber composition B, wherein said flow director channels individually communicate directly with the base of said flow deflectors, wherein said secondary stream of said rubber composition B thereby flows into said channels from the base thereof and within said flow deflector channels at an initial direction of about 90° to said flow of said main stream of said first rubber composition A;

(D) simultaneously introducing said N individual secondary streams of said additional rubber composition B (as they exit from said internal channels) between said N+1 individual main streams of said first rubber composition A by causing the direction of said individual secondary streams of additional rubber composition B to be re-directed about 90° from said initial flow direction in the channels within said flow deflectors to exit said internal channels of said flow deflectors in the same flow direction as said main stream of said first rubber composition A, to thereby form a rubber composite stream of alternating layers of said first rubber composition A and said additional rubber composition B within said former; and (E) simultaneously shaping said rubber composite stream through a die opening with a prescribed contour to finally obtain a shaped rubber composite (extrudate) comprised of N+1 layers of said first rubber composition A individually alternated with N layers of said additional rubber composition B.

In further accordance with this invention, a multi-layered rubber composite prepared by the process of this invention is provided.

In practice, such rubber composite is comprised of alternating layers of main layers corresponding to said main rubber stream and secondary layers corresponding to said secondary rubber streams of rubber composition differing from the rubber composition of said main rubber layer.

Thus the rubber composite (and, correspondingly, the said streams of the process of this invention) may be composed of ("N+1") layers of said first rubber composition and ("N") alternating layers of said additional rubber composition (the layers of said first rubber composition alternating with layers of said additional rubber composition(s)).

In practice the number "N" may range, for example, from 3 to 50 and alternately from 3 to 30.

In practice, the ratio of thickness of said additional to said first layers of said rubber composite layers (and somewhat correspondingly, the ratio of said respective streams of said main stream and said secondary streams to form said stream of rubber composite) may range, for example, from about 0.05/1 to about 20/1.

In practice, the number of said additional rubber compositions may range from, for example, one to three rubber compositions, particularly wherein said additional rubber compositions are different from said first rubber composition and wherein each of said additional rubber compositions (where there are at least two additional rubber compositions) are different from each other. In one aspect, said additional rubber composition may be an individual rubber composition (a singular additional rubber composition) which is different from said first rubber composition.

In one aspect of the invention, the process comprises adjusting the respective proportions of said main and said secondary individual streams by adjusting the spacing between the said flow deflectors and the width of said exit portion of said internal channels of said flow deflectors.

In another aspect of the invention, the process comprises adjusting the ratio of individual said main streams and said secondary streams by adjusting the flow rate of said first and additional rubber compositions from their respective extruders to said former.

As hereinbefore related, an aspect of the process comprises positioning said "N" number of individual flow director channels within said base of said former to individually communicate with the internal channels of said "N" flow deflectors to guide the flow of said additional rubber composition(s) into said internal channels of said deflectors to form a plurality of said secondary streams.

In practice, a desired external contour may be achieved together with hereinbefore related controlled interfaces between adjacent layers by the process of this invention. Furthermore, as hereinbefore related, the respective ratio of each rubber composition is adjustable through variations in the number N of flow deflectors, the spacing between deflectors and operating parameters for the rubber streams such as, for example, rotational speeds of the internal screws contained in the extruders which feed the rubber streams to the former.

In additional accordance with this invention, a tire having at least one component comprised of said multi-layered rubber composite is provided.

DETAILED DESCRIPTION OF THE DRAWINGS

Figure 1:
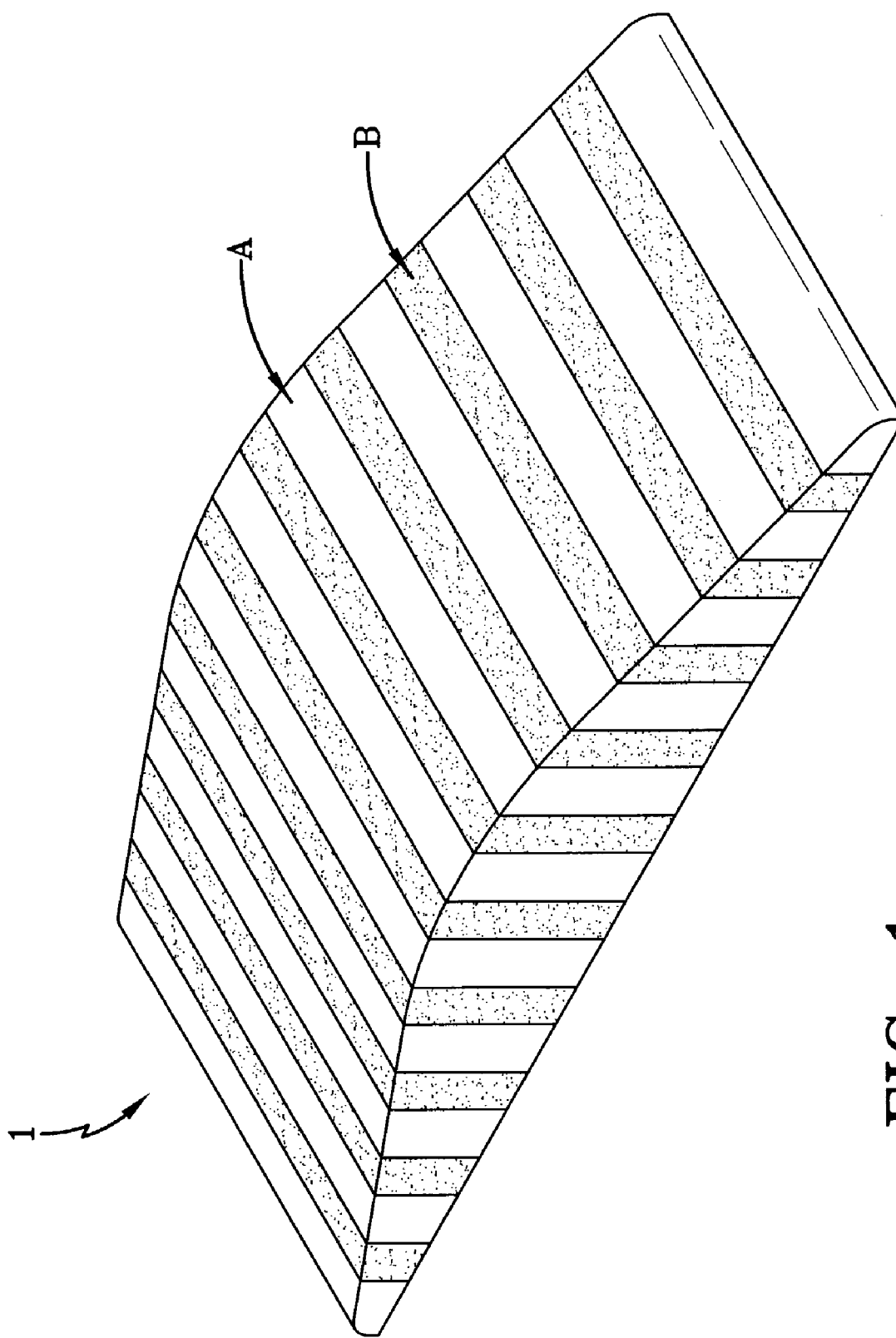
FIG. 1 is presented to illustrate the cross-section of an extruded multi-layered composition prepared by this invention.

In particular, FIG. 1 shows said multi-layered extrudate (1) composed of alternating layers of a first rubber composition A and a second rubber composition B. As it can be seen, the layers of rubber composition A and rubber composition B are relatively parallel to each other, and extend from one surface to the opposing surface of the extrudate (1).

In FIG. 1, the multi-layered is presented with the bottom side being flat, since this side of the extrudate is usually deposed on a flat take-away belt after shaping through the die opening, and the top side having a convex shape corresponding to the desired external contour for the component.

Figure 2:
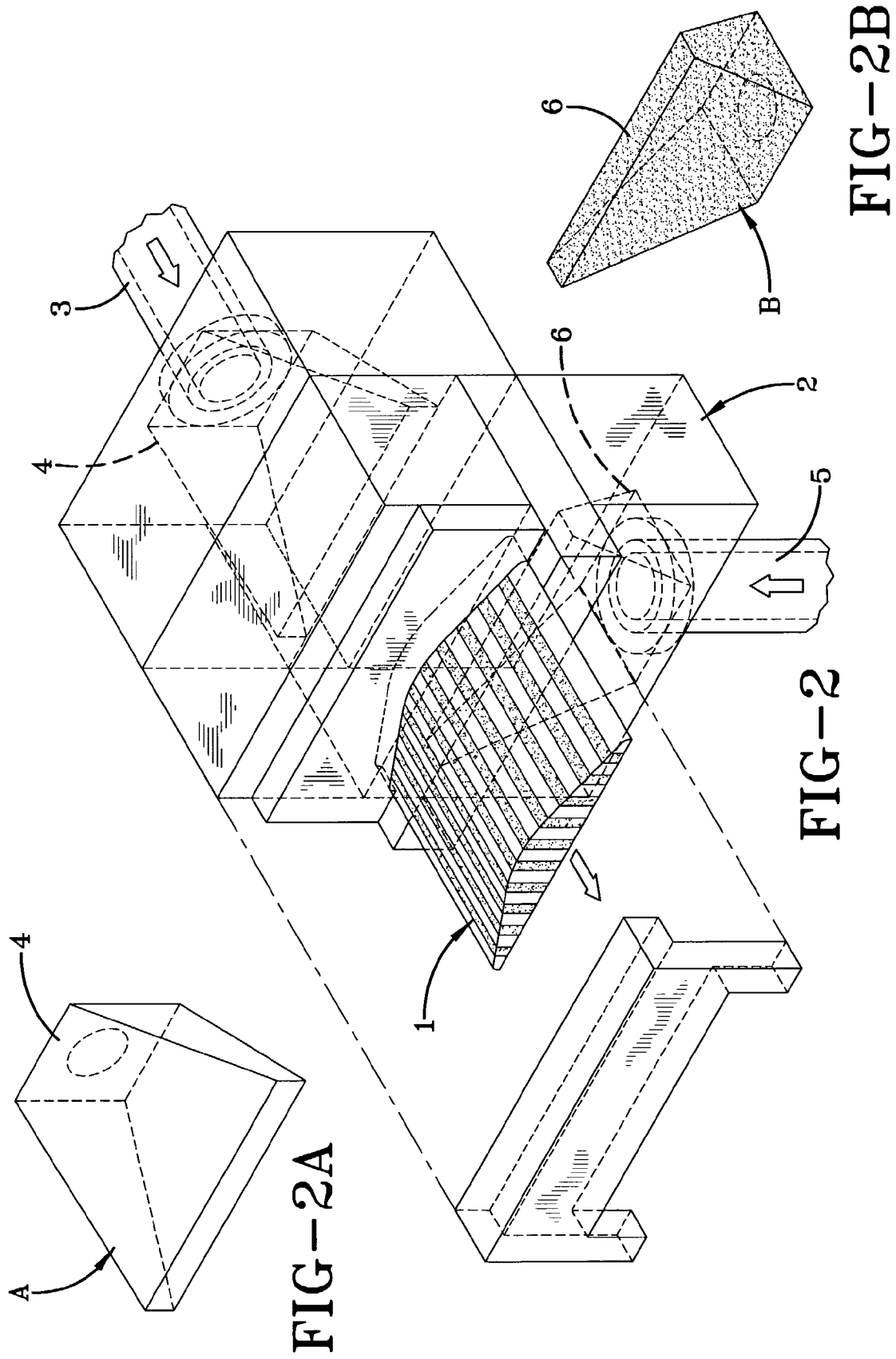
FIG. 2 is presented to illustrate a shell of a former, including its internal cavity, with a positioning of external extruders and said extruded multi-layered composition, with FIGS. 2A and 2B representing transition portions to accommodate the streams of rubber from its extruder to the former.

FIG. 2 depicts the shell of the former (2), extruder (3) for the main stream rubber composition, and a corresponding transition zone (4), shown in FIG. 2A, for introducing the main stream rubber composition A into the cavity of the former (2), and extruder (5), and the corresponding transition channel (6) shown in FIG. 2B, for introducing the second rubber composition B to the base of the former (2) in a direction substantially 90° to the flow of the main stream of rubber composition A from said extruder (3). The produced extrudate (1) is depicted within the cavity of the former (2) after passing through a die opening for illustration purposes. In FIG. 2, the respective arrows depict the flow of the main stream of first rubber composition A and second rubber composition B as well as the extrudate (1).

Figure 3:
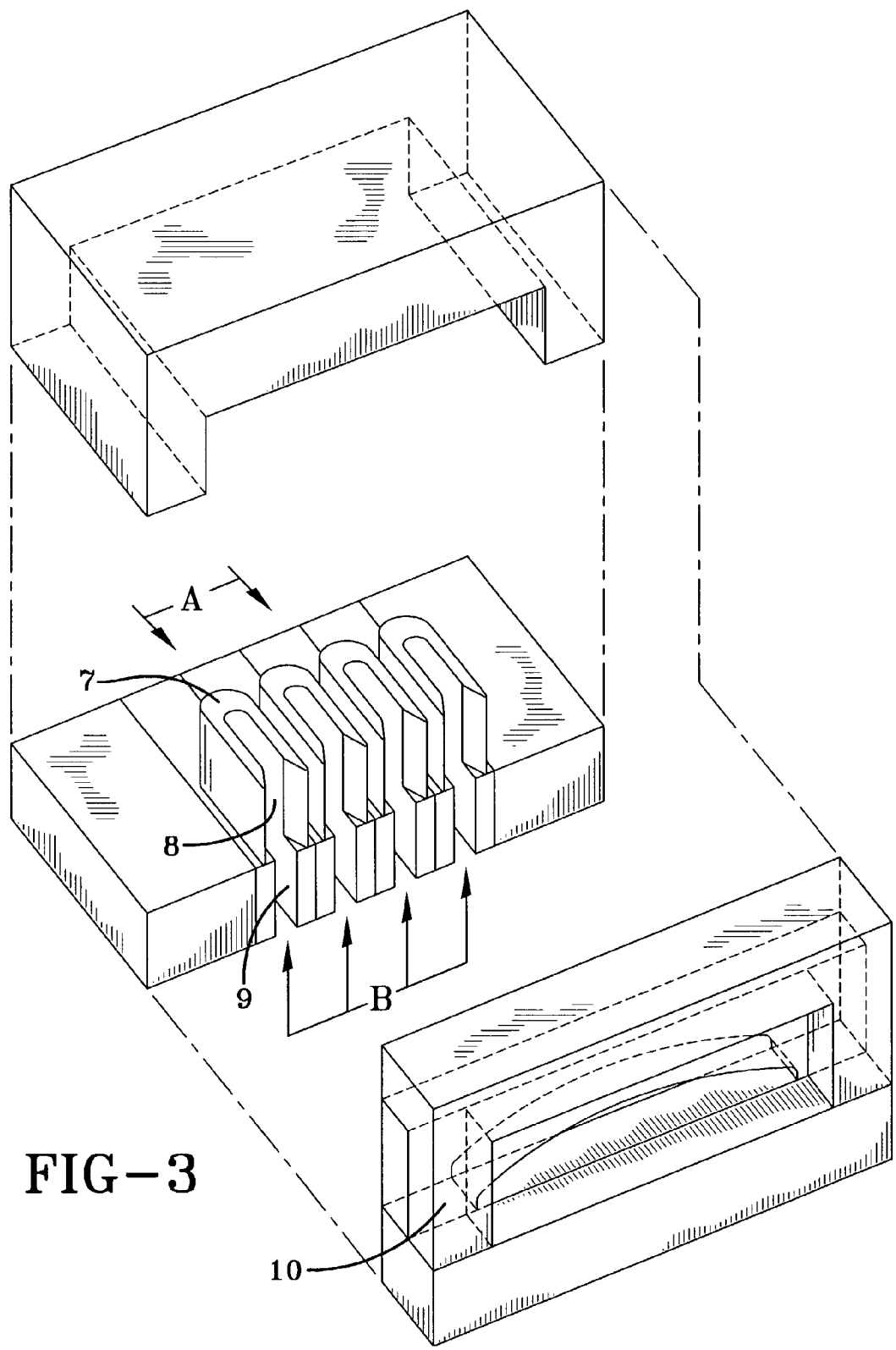
FIG. 3 is presented to show details of the internal cavity of said former with flow deflectors positioned within said internal cavity and flow director channels extending throughout the base of said former.

FIG. 3 depicts four (where N=4) spaced apart internal flow deflectors (7) around which (N+1) individual spaced apart main streams of first rubber composition A are caused to flow and the four (N=4) internal flow directors (9), which communicate directly with the internal channels (8) within said flow deflectors (7) and thereby cause the stream of second rubber composition B to initially flow in a direction of about 90° to the streams of rubber composition A and to then turn 90° to flow in the same direction of the spaced apart streams of rubber composition A in a manner to flow between said streams of rubber composition A as they flow around the outer surface of said flow deflectors (7) to form the extruded multi-layered composite (1). FIG. 3 also features a contoured die (10) for shaping the multi-layered composite into the desired contour as it leaves the former.

Figure 4:
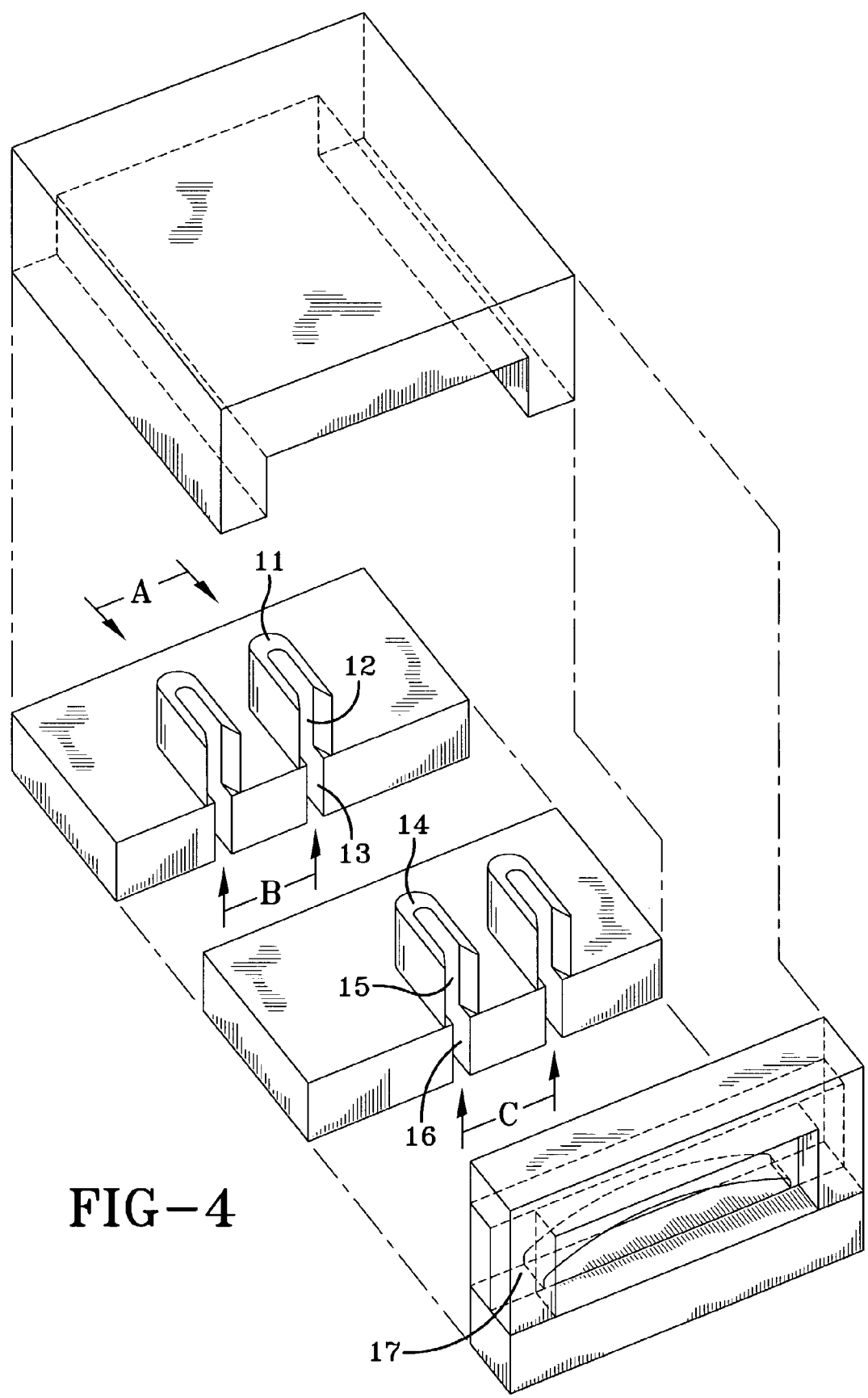
FIG. 4 is presented to illustrate details of the internal cavity of said former with flow deflectors and flow director channels positioned in a particular configuration to accommodate streams of three individual rubber compositions.

FIG. 4 depicts a situation similar to FIG. 3 except that the internal cavity of the former is fitted with four deflectors to accommodate streams of three individual rubber compositions. Two rows of two spaced apart flow deflectors are represented. The stream of the first, main stream, rubber composition A is split around the first row of deflectors (11), while two flow directors (13), which communicate directly with the internal channels (12) within said flow deflectors (11) are used to feed a second rubber composition B. Said internal channels (12) cause the streams of second rubber composition B to turn 90° prior to flow between said spaced apart streams of rubber composition A. In a second stage, the main stream of rubber compositions A and B resulting from the first split and merge process is divided by the second row of deflectors (14), and a third rubber composition C is fed through two additional flow directors (16) which communicate directly with the internal channels (15) located within said flow deflectors (14). Said internal channels (15) cause the streams of third rubber composition C to turn 90° prior to flowing between said streams of rubber composition A and B. FIG. 4 also features a contoured die (17) for shaping the multi-layered composite into the desired contour as it leaves the former.

In the practice of this invention, variations in the number of alternating layers and/or variations in the relative thickness of main and secondary layers are intended to be within the scope of the invention. Further, the working principle of this invention may be customized to other extruder layouts like, for instance, duplex extruders operating in a "nose-to-nose" or "piggy back" configuration. Finally, in the practice of this invention, more than two rubber compositions (e.g. from 3 to 4) may be co-extruded to form the extrudate, although it is preferred that two different rubber compositions be used.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a multi-layered rubber composite composed of a first rubber composition and at least one additional rubber composition configured as alternating, parallel aligned, layers of said rubber compositions, wherein said first rubber composition layer alternates with at least one of said additional rubber composition layers, wherein each rubber layer extends through said rubber composite from one side to the opposite side of said rubber composite, by:
   (A) simultaneously extruding said first rubber composition and said at least one additional rubber composition through an individual extruder for each of said rubber compositions to form a main stream of said first rubber composition and a secondary stream of each additional rubber composition;
   (B) simultaneously introducing said main stream and said secondary stream(s) to a former, where said former is comprised of:
      (1) a base portion, a top portion and an internal cavity therebetween, wherein said top portion is positioned opposite said base portion; and
      (2) a plurality of "N" spaced apart individual flow deflectors (where "N" is the number of said flow deflectors) positioned within said internal cavity;
      wherein said flow deflectors individually extend from said base portion to said top portion within said internal cavity, thereby connecting with said base portion and said top portion;
      wherein said flow deflectors each contain an internal channel, said channel having an entrance portion which communicates with said base portion and having an exit portion, exclusive of said entrance portion, wherein said main stream is introduced into said internal cavity of said former and wherein said secondary stream(s) are introduced through said base portion of said former into said entrance portions of said internal channels within said flow deflectors to simultaneously:
      (a) cause said main stream to flow around at least a portion of each individual flow deflector, exclusive of said exit portion of said internal channels, and to thereby separate into a plurality of N+1 individual spaced apart main streams, and
      (b) cause said secondary streams to flow within said individual internal channels of said flow deflectors to exit from each of said internal channels through said exit portion thereof and to thereby form a plurality of N individual secondary streams;
      wherein said exit portions of said internal channels are positioned on said flow deflectors to cause said plurality of said individual secondary streams to exit said flow deflectors and, upon exiting therefrom, to flow in the direction of and between said individual main streams and to adhere to said individual main streams to form a stream of a rubber composite of alternating layers of said first rubber composition and said additional rubber composition(s); and
   (C) simultaneously shaping said rubber composite stream through a die opening contained in a die member affixed to said former to form a shaped rubber composite;
   wherein said alternating layers of said first rubber composition and said additional rubber composition(s) are parallel to each other extend through said rubber composite from the surface of one side to the surface of the opposing side.

2. The process of claim 1 wherein said base portion of said former contains "N" individual flow director channels positioned therein, wherein each individual flow director channel is aligned with and communicates with a corresponding individual entrance portion of an internal channel of a flow deflector of said former to separate said secondary stream(s) from their individual extruder(s) into a plurality of "N" individual secondary streams and introduce said plurality of individual secondary streams into said corresponding "N" internal channels within said deflectors through said base portion of said former.

3. The process of claim 1 wherein said internal flow deflectors are aligned in a single row substantially parallel to each other wherein said row is positioned substantially 90° to said flow of said main stream.

4. The process of claim 1 wherein said internal flow deflectors are aligned in at least two separate rows thereof with a first row positioned in front of at least one additional row, wherein each row is comprised of at least two flow deflectors positioned substantially parallel to each other within its individual row, wherein each row is positioned substantially 90° to said flow of said main stream and wherein the flow deflectors of said first row are individually off-set from individual deflectors of said additional row(s) in a manner that said individual flow deflectors are directly in the path of and thereby directly receive said flow of said main stream.

5. The process of claim 1 wherein "N" is a value ranging from 2 to 50.

6. The process of claim 1 wherein the number of said additional rubber compositions ranges from one to three rubber compositions and wherein said additional rubber compositions are different from said first rubber compositions and each of said additional rubber compositions are different from each other.

7. The process of claim 1 wherein said additional rubber composition is a single individual rubber composition and where said additional rubber composition is different from said first rubber composition.

8. The process of claim 1 wherein the ratio of thickness of said main layers to said secondary layers ranges from 0.05/1 to about 20/1.

9. The process of claim 1 which comprises adjusting the respective proportions of said main and said secondary individual streams by adjusting the spacing between the said flow deflectors and the width of said exit portion of said internal channels of said flow deflectors.

10. The process of claim 1 which comprises adjusting the ratio of individual said main streams and said secondary streams by adjusting the flow rate of said first and additional rubber compositions from their respective extruders to said former.

11. The process of claim 1 wherein said "N" number of individual flow director channels are positioned within said base of said former to individually communicate with the internal channels of said "N" flow deflectors to guide the flow of said additional rubber composition(s) into said internal channels of said deflectors to form a plurality of said secondary streams.

12. The process of claim 1 wherein said process comprises:

(A) simultaneously extruding two individual rubber compositions, as a first rubber composition A and an additional rubber composition B, to form individual streams of each rubber composition, namely a main stream of said first rubber composition A and secondary stream of said additional rubber composition B, via an individual extruder for each rubber composition, to an internal cavity of a former;

(B) simultaneously introducing said main stream of said first rubber composition A from its extruder into said internal cavity of said former to flow within said cavity around the plurality of N number of flow deflectors, wherein said flow deflectors are spaced apart from each other by substantially equal distances, wherein said flow deflectors are positioned parallel to each other within said cavity of said former to cause said main stream of rubber composition A to divide into N+1 individual streaming layers of said rubber composition A within the cavity of said former;

(C) simultaneously introducing said secondary stream of said additional rubber composition B into said internal channels contained within said flow deflectors through a plurality of N number of flow director channels extending through the base of said internal former, to create N individual secondary streams of rubber composition B, wherein said flow director channels individually communicate directly with the base of said flow deflectors, wherein said secondary stream of said rubber composition B thereby flows into said channels from the base thereof and within said flow deflector channels at an initial direction of about 90° to said flow of said main stream said first rubber composition A;

(D) simultaneously introducing said N individual secondary streams of said additional rubber composition B (as they exit from said internal channels) between said N+1 individual main streams of said first rubber composition A by causing the direction of said individual secondary streams of additional rubber composition B to be re-directed about 90° from said initial flow direction in the channels within said flow deflectors to exit said internal channels of said flow deflectors in the same flow direction as said main stream of said first rubber composition A, to thereby form a rubber composite stream of alternating layers of said first rubber composition A and said additional rubber composition B within said former; and (E) simultaneously shaping said rubber composite stream through a die opening having a prescribed contour to finally obtain a shaped rubber composite (extrudate) comprised of N+1 layers of said first rubber composition A individually alternated with N layers of said additional rubber composition B.

13. The process of claim 1 wherein said shaped rubber composite has a flat bottom side and a convex top side.

\* \* \* \* \*